2,816,135
PRODUCTION OF ESTERS OF ACRYLIC ACID

John J. Healy, Jr., St. Louis, Mo., assignor to Monsanto Chemical Company, St. Louis, Mo., a corporation of Delaware No Drawing. Application March 10, 1954, Serial No. 415,423

6 Claims. (Cl. 260—486)

This invention relates to an improved process for the production of acrylic acid esters and, more particularly to the preparation of such esters by the reaction of acrylonitrile with an alkyl hydrogen sulfate.

Several methods are known for the preparation of alkyl esters of acrylic acid from acrylonitrile. In all of these, the overall reaction may be represented by the following equation:

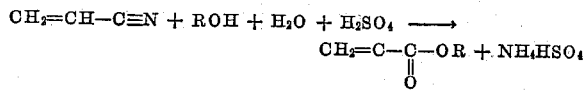

The processes are for the most part two-step processes. In one method, in the first step, acrylonitrile is reacted with water in the presence of a strong mineral acid to yield acrylic acid or acrylamide, depending upon the proportions of water and acrylonitrile which are present in the reaction mixture. In the second step, the reaction product formed in the first step is reacted with an alcohol to form the desired ester or, in the case where acrylic acid is the product of step one, the acid is recovered from the reaction product and esterified with an alcohol by usual and well known techniques. Such a process is described in U. S. 2,526,310. In another method, that described in U. S. 2,666,782, for example, acrylonitrile and a strong mineral oxy acid, such as sulfuric acid, are reacted in the first step, and an alkanol, either alone or together with a quantity of water, is reacted with the acrylonitrile-acid reaction product to form the alkyl acrylate in the second step.

These processes as well as others in the prior art have some disadvantages. In the first method described above, for example, significant amounts of acrylonitrile are converted to β-alkoxypropionates rather than to the desired esters. While it is true that the acrylates may be recovered from these byproducts, conversion is a troublesome operation requiring extraction with ether and then treatment with phosphorus pentoxide at 150–170° C. or catalytic decomposition in the vapor phase at 320–380° C. over an alumina catalyst. In the other method described, special equipment must be provided because of the corrosivity of the acrylonitrile-acid intermediate product. In both cases, reaction time is lengthy and hence losses from polymerization can become significant.

It is, therefore, an object of the present invention to provide an improved one-step process for the preparation of alkyl esters of acrylic acid.

It is another object of the invention to provide an improved, economical, one-step process for the production of alkyl esters of acrylic acid in good yield from acrylonitrile which does not require unduly long process operations and where losses from polymerization are negligible.

Other objects and advantages of the invention will become apparent hereinafter.

According to the invention, alkyl esters of acrylic acid are produced by reacting acrylonitrile with an alkyl hydrogen sulfate in the presence of water according to the following equation:

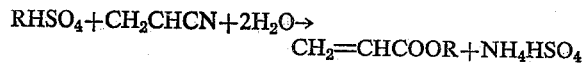

The acrylate produced is readily separated from the reaction mixture by conventional distillation techniques.

The following examples will illustrate the method of carrying out the process of the invention but are not to be construed as limiting its scope.

Example I

To 1.5 moles of ethyl hydrogen sulfate contained in a 300-ml. flask equipped with a stirrer, thermometer, and dropping funnel there was added 2.5 moles of water at room temperature. About 0.2 g. of copper powder and 2.0 g. of hydroquinone were also added to the contents of the flask to serve to inhibit polymerization of acrylonitrile. The mixture was heated to 100° C. and one mole of acrylonitrile was then added to the mixture dropwise over a one-hour period while the temperature was maintained at 100–110° C. After addition of acrylonitrile was complete, the reaction mixture was refluxed for an additional 30 minutes. The dropping funnel was then replaced by a simple condenser and the reaction mixture was flash distilled. The distillate was shaken with three 10 g. portions of calcium chloride and 5 g. of water and the organic layer was then fractionated to recover the ethyl acrylate fraction. Approximately 63% of the acrylonitrile fed was converted to ethyl acrylate and the overall yield of ethyl acrylate based on acrylonitrile was about 85%.

Example II

Equivalent molar quantities of acrylonitrile and water (1:2) are slowly added simultaneously to 1.5 moles of methyl hydrogen sulfate containing 2.0 g. of hydroquinone in a reaction flask similar to that employed in Example I over a period of about one hour while the temperature is maintained within the range from 100–110° C. The mixture is allowed to reflux for an additional 30 minutes after addition of the reactants is completed.

The reaction product is worked up as described in Example I and a yield of methyl acrylate comparable to that of ethyl acrylate in Example I is obtained.

Example III

About 630 g. of isopropyl hydrogen sulfate to which has been added 6.0 g. of hydroquinone are charged to a suitable reactor fitted with a stirrer and condenser at room temperature. The reactor is heated gradually and brought up to a temperature of about 100–110° C. To this mixture, 159 g. of acrylonitrile and 108 g. of water are added slowly and simultaneously with stirring. After addition of the reactants is complete, the reaction mixture is refluxed for approximately 1½ hours while the temperature is maintained in the range from 100–110° C. The reaction product is then flash distilled and the distillate is subjected to a conventional azeotropic distillation to recover a fraction of isopropyl acrylate in a yield comparable to that obtained in Example I.

Some variations in procedure from that given in the examples may be made without departing from the scope of the invention. While the preferred temperature for the reaction lies in the 100–110° C. range, the reaction may be effected at any temperature within the range from 60–120° C.

In general, stoichiometric proportions of the reactants may be employed. However, an excess of the alkyl hydrogen sulfate up to about 50% is preferred since it acts to influence the equilibrium of the reaction in the direction of the formation of the acrylate.

The order in which the reactants are added is not critical. Some advantages are to be gained, however, by adding the acrylonitrile and water in equivalent quantities together to the alkyl hydrogen sulfate. This order of addition serves to repress any tendency toward the formation of the alcohol from the alkyl hydrogen sulfate while at the same time keeping down the quantity of water in the reaction. It also aids in preventing the formation or splitting off of dialkyl ethers.

Suitable alkyl hydrogen sulfates include those mentioned in the examples, methyl, ethyl and isopropyl hydrogen sulfates respectively, as well as butyl hydrogen sulfate, isobutyl hydrogen sulfate, and the like. Alkyl hydrogen sulfates wherein the alkyl group contains from 1 to 8 carbon atoms are particularly useful in this invention.

Acrylonitrile and reaction products thereof have a strong tendency to polymerize and control against such polymerization during the reaction is provided by employing in the reaction mixture a small amount of a material which will inhibit polymerization of acrylonitrile. Stabilizers such as powdered metallic copper, tert-butyl catechol, hydroquinone, p-aminophenols, or any of a number of other materials known to inhibit the polymerization of acrylic compounds may be used. Quantities varying from about 0.05% to about 5% by weight of the acrylonitrile employed are generally satisfactory. More than 5% based on the weight of acrylonitrile may be employed but such higher concentrations of inhibitor do not appear to provide any advantages in proportion to the increase in cost resulting from their use. The inhibitor may be added to the acrylonitrile before it is introduced into the reaction mixture, or it may be added to the reaction mixture directly before or simultaneously with the addition of the acrylonitrile.

The reaction product from the process of the invention frequently contains small quantities of the alcohol corresponding to the acrylic acid ester produced. When this occurs, fractional distillation of the reaction mixture does not serve to completely separate the ester from the alcohol because of the usual formation of ester-alcohol azeotropes. However, excellent yields of the acrylate may still be obtained by the addition to the mixture of a compound which forms an azeotrope with the alcohol having a lower boiling point than the alcohol-ester azeotrope and distillation in the presence of such a compound. This practice permits ready separation of the alcohol and the added compound overhead while the acrylate remains behind in the residue of the distillation. This residue may then be fractionally distilled and a relatively pure acrylate fraction recovered in the final distillation. In general, hydrocarbons having boiling points in the neighborhood of the boiling point of the alcohol to be separated may be used in this azeotropic distillation. Preferably a hydrocarbon boiling no higher than and within 30° C. of the alcohol is employed to separate the acrylate from the corresponding alcohol.

What is claimed is:

1. A process for the production of alkyl esters of acrylic acid which comprises reacting acrylonitrile and an alkyl hydrogen sulfate, wherein the alkyl group contains from 1 to 8 carbon atoms, in the presence of water at a temperature in the range from about 60° C. to about 120° C.

2. A process for the production of alkyl esters of acrylic acid which comprises reacting acrylonitrile and an alkyl hydrogen sulfate, wherein the alkyl group contains from 1 to 8 carbon atoms, in the presence of water and in the presence of an inhibitor of polymerization of acrylic compounds, at a temperature in the range from about 60° C. to about 120° C.

3. A process for the production of alkyl esters of acrylic acid which comprises reacting a molecular proportion of acrylonitrile with at least a molecular proportion of an alkyl hydrogen sulfate, wherein the alkyl group contains from 1 to 8 carbon atoms, and at least two molecular proportions of water, at a temperature in the range from about 60° C. to about 120° C.

4. The process as described in claim 3 wherein the alkyl hydrogen sulfate is methyl hydrogen sulfate.

5. The process as described in claim 3 wherein the alkyl hydrogen sulfate is ethyl hydrogen sulfate.

6. The process as described in claim 3 wherein the alkyl hydrogen sulfate is isopropyl hydrogen sulfate.

References Cited in the file of this patent

UNITED STATES PATENTS

| | | |
|---|---|---|
| 1,829,208 | Bauer | Oct. 27, 1931 |
| 2,056,771 | Crawford | Oct. 6, 1936 |
| 2,526,310 | Wiley et al. | Oct. 17, 1950 |
| 2,666,782 | Brockway | Jan. 19, 1954 |